United States Patent [19]

Curtiss

[11] Patent Number: 5,005,934
[45] Date of Patent: Apr. 9, 1991

[54] FIBER OPTICS CHANNEL SELECTION DEVICE

[75] Inventor: Lawrence E. Curtiss, Concord, Mass.

[73] Assignee: Galileo Electro-Optics Corporation, Sturbridge, Mass.

[21] Appl. No.: 378,145

[22] Filed: Jul. 11, 1989

[51] Int. Cl.⁵ .............................. G02B 6/26; G02B 6/32
[52] U.S. Cl. ............................... 350/96.15; 350/96.16; 350/96.18; 250/227.11
[58] Field of Search ............... 350/96.10, 96.15, 96.18, 350/96.20, 96.21, 96.22, 96.16; 250/227.11; 370/1, 3

[56] References Cited

U.S. PATENT DOCUMENTS

| | | | |
|---|---|---|---|
| 4,378,144 | 3/1983 | Duck et al. | 350/96.18 |
| 4,650,277 | 3/1987 | Husher et al. | 350/96.20 |
| 4,707,605 | 11/1987 | Astheimer et al. | 250/347 |
| 4,755,054 | 7/1988 | Ferree | 356/418 |
| 4,923,270 | 5/1990 | Carter | 350/96.18 |
| 4,927,226 | 5/1990 | Ortiz, Jr. | 350/96.18 X |
| 4,938,555 | 7/1990 | Savage | 350/96.15 |

FOREIGN PATENT DOCUMENTS 58-72108  4/1983  Japan .................. 350/96.15

Primary Examiner—Brian Healy
Attorney, Agent, or Firm—Robert F. O'Connell

[57] ABSTRACT

An optical signal channel selection device which includes a plurality of first fixed optical signal channels for transmitting optical signals along a plurality of first parallel optical axes and a second fixed optical signal channel for transmitting optical signals along a second optical channel axis parallel to the first axes. A pair of reflective surfaces are fixed so as to be parallel to each other, the reflective surfaces being movable between the first optical channels and the second optical channel so that a first one of the reflective surfaces can be selectively positioned opposite selected ones of the first signal channels and the second reflective surface is positioned opposite the second signal channel. An input optical signal from a selected one of the first channels is incident on the first reflective surface and is directed toward the second reflective surfaces so as to be reflected therefrom in parallel with the input optical signal.

13 Claims, 1 Drawing Sheet

FIBER OPTICS CHANNEL SELECTION DEVICE

INTRODUCTION

This invention relates generally to optical signal channel selection devices and, more particularly, to a novel structure for such devices for use with optical fibers.

BACKGROUND OF THE INVENTION

When using optical fibers to transmit optical signals, it is often necessary to direct optical signals between a plurality of optical fiber circuits or optical elements and a single optical fiber circuit or optical element, such as an optical signal detector. In order to do so, it is desirable to utilize an optical signal channel selection, or switching, device, sometimes referred to as an optical multiplexer. In one particular embodiment, for example, such a device can be arranged so as to interconnect a selected one of a plurality of transmitting optical fiber circuits to a single optical fiber circuit or optical element.

In one particular application, it is desirable to conduct light from a light source and wavelength selection portion of a spectroscopic analyzer through an optical fiber to a remote sensor and back through another optical fiber to the detector portion of the analyzer. When using heavy metal flouride glass (HMFG) optical fibers, it is advantageous to use single, small diameter fibers to connect the analyzer to the sensor because of the relatively high cost of such fibers. The use of such small diameter fibers, which carry less energy than larger diameter fibers, requires the use of a very sensitive analyzer, such as a Fourier Transform Infrared (FTIR) spectrometer which is relatively costly when compared with less sensitive analyzers. Accordingly, it is economically desirable to devise a technique for sharing a single analyzer among several sensors by using an optical signal channel selection device.

Other applications in which it is desirable to switch relatively easily and reliably from one optical signal channel, such as an optical fiber circuit, or optical element, to another occurs when switching is required between one or more circuits containing samples to be analyzed and a reference circuit, the use of such sample/reference circuitry often being required in many spectrometers in order to maintain the calibration accuracy necessary for the quantitative measurements being made.

In currently available optical fiber switches, or optical signal channel selection devices, the end of one optical fiber is physically transported so as to be aligned axially and in close proximity to the end of one of a plurality of optical fibers to which it is to be coupled. In such devices, the relative movement between the fibers is usually effected by using a stepping motor to cause an optical fiber to be physically transported in a linear motion into the desired positions for interfacial and axial alignment with each of the other fibers which are positioned in line along the direction of such linear motion.

Since the fiber cores which transmit the light are relatively small, in some cases the end of the fiber core having a diameter of less than 0.15 mm, the alignment of the end faces of the fibers must be very precisely controlled if light is to be effectively coupled between them. A lateral position error of 0.01 mm in such interface positional accuracy when using core diameters of 0.1 mm, for example, can produce about a 10% reduction in coupling efficiency. Moreover, if the angle that one fiber axis makes relative to the other fiber axis to which it is being coupled is out of alignment, the coupling efficiency is also reduced. In some applications, an axial mis-alignment of as little as 1° may reduce the coupling efficiency to a level below a desired efficiency level. Such reductions can have an extremely adverse effect, particularly when providing precision quantitative spectroscopy measurements.

In addition, the techniques for moving fibers into close proximity with each other, as used in existing optical signal channel selection devices, make the small fiber core end areas quite vulnerable to changes in coupling efficiency which are caused by the presence of small particles, such as dust particles or other debris, which might lodge on the end face of one or both of the fibers. Moreover, such small diameter fibers are relatively fragile and repeated physical movement thereof may tend to subject the fibers to damage over a period of time.

It is desirable, therefore, to devise an optical signal channel selection device which will reliably and relatively easily permit selected ones of a plurality of optical fiber circuits, or elements, to be optically coupled to a single fiber circuit or optical element, for example, with a high degree of positional and axial accuracies, so as to provide high coupling efficiency, as when used for quantitative spectroscopic applications. It is further desirable that such a device avoid any vulnerability to the presence of dust, or other, particles on the fiber end faces and to avoid excessive repeated movement of the fibers so that damage which may tend to result therefrom can be avoided.

BRIEF SUMMARY OF THE INVENTION

In accordance with the invention, each of a plurality of optical signal channels, which are intended to be switched into optical communication with a single optical channel, such as an optical fiber or an optical element, are fixedly positioned, preferably in a circular arrangement, along different, but parallel, axes, each of such axes also being parallel to the axis of the fixedly positioned single optical channel. A pair of optical reflecting surfaces, or mirrors, are fixedly positioned relative to each other so as to be parallel with respect to each other. The pair of parallel optical reflecting surfaces are preferably mounted so as to be rotatable on a rotor structure between the plurality of optical signal channels and the single optical signal channel so that one of the reflecting surfaces can be selectively aligned in optical communication with a selected one of the plurality of optical signal channels, the other reflective surface being substantially always aligned in optical communication with the single optical channel. As the one reflective surface is selectively moved into optical communication with each of the plurality of optical signal channels, optical signals can be transmitted between each selected optical signal channel and the single optical signal channel with a high degree of optical coupling efficiency.

In accordance with such a device, although tight angular tolerances are required on the fixedly positioned parts, the coupling efficiency is not adversely affected by errors which may arise in the positioning accuracy of the rotor structure, which positioning errors can be as high as several fiber diameters. Moreover, the angular alignments of the parallel mirrors with respect to the axes of the optical channels with which they are in communication can have relatively relaxed tolerances without adversely affecting the coupling efficiency.

DESCRIPTION OF THE INVENTION

The invention can be described in more detail with the help of the accompanying drawings wherein FIG. 1 shows a side view of an embodiment of the invention; and FIG. 2 shows an end view along the line 2—2 of a part of the embodiment shown in FIG. 1.

DETAILED DESCRIPTION OF THE INVENTION

Figure 1:
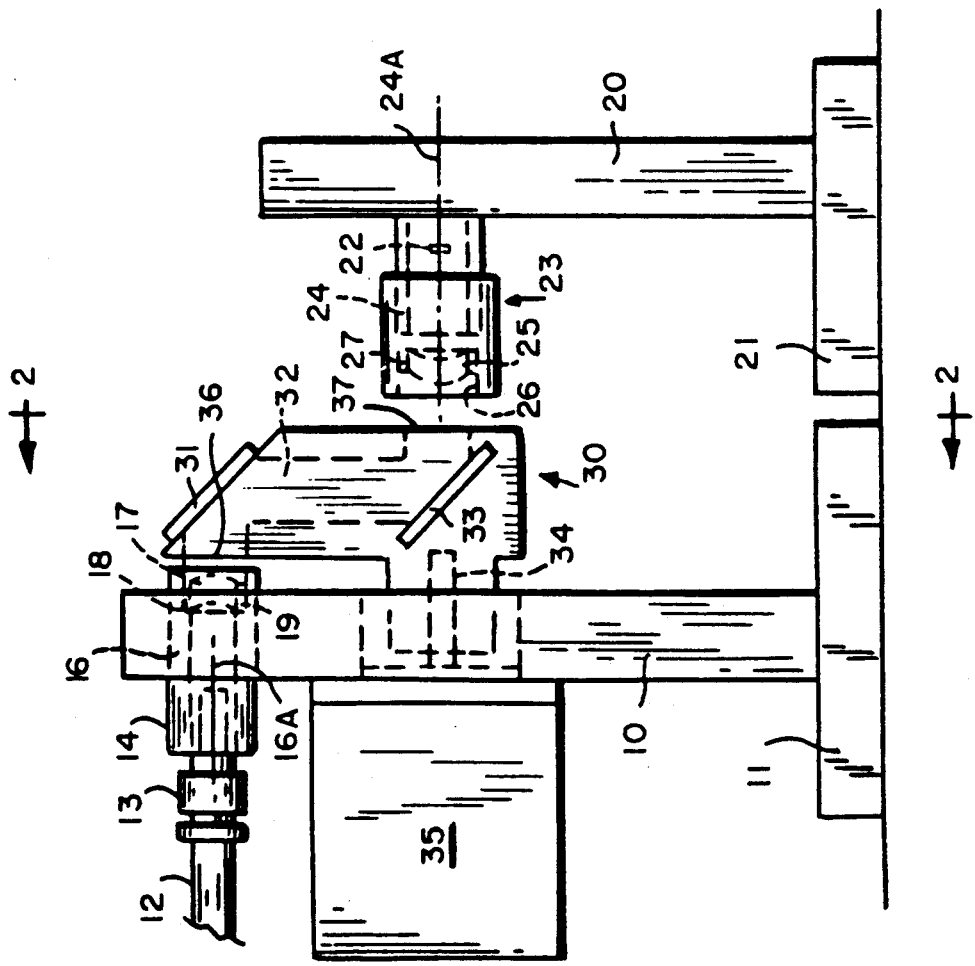

As can be see in FIG. 1, a mounting plate 10 is fixedly attached to a base plate 11 so as to project perpendicularly and upwardly therefrom as shown. An optical fiber 12 capable of carrying an optical signal has a connector 13 at one end thereof which permits the fiber to be plugged into an input end of an optical module 14 mounted in an opening in mounting plate 10 so that the fiber core thereof (not shown) within the connector, which fiber core carries the optical signal, projects into module 14 along the axis 16A of an optical channel 16 which is formed within optical module 14. A lens 17 is mounted in a recess 18 at the exit, or output, end of module 14 along axis 16A. Lens 17 receives the optical signal from the fiber core and produces a collimated optical beam signal which beam is transmitted along the direction of the axis 16A of optical a channel 16. When the lens has been correctly positioned both axially and laterally relative to the fiber core in order to produce such collimated beam along the axis 16A of optical channel 16, the lens can be fixedly retained in recess 18 by utilizing an appropriate cement, or other adhesive, material 19 to permanently hold the alignment of the lens so that it always produces a collimated beam in the desired direction. While a lens for producing the desired collimated beam is depicted in the particular exemplary embodiment described, any other suitable means for providing such a collimated beam from the optical signal at the fiber core can be chosen and used by those in the art for such purpose.

Figure 2:
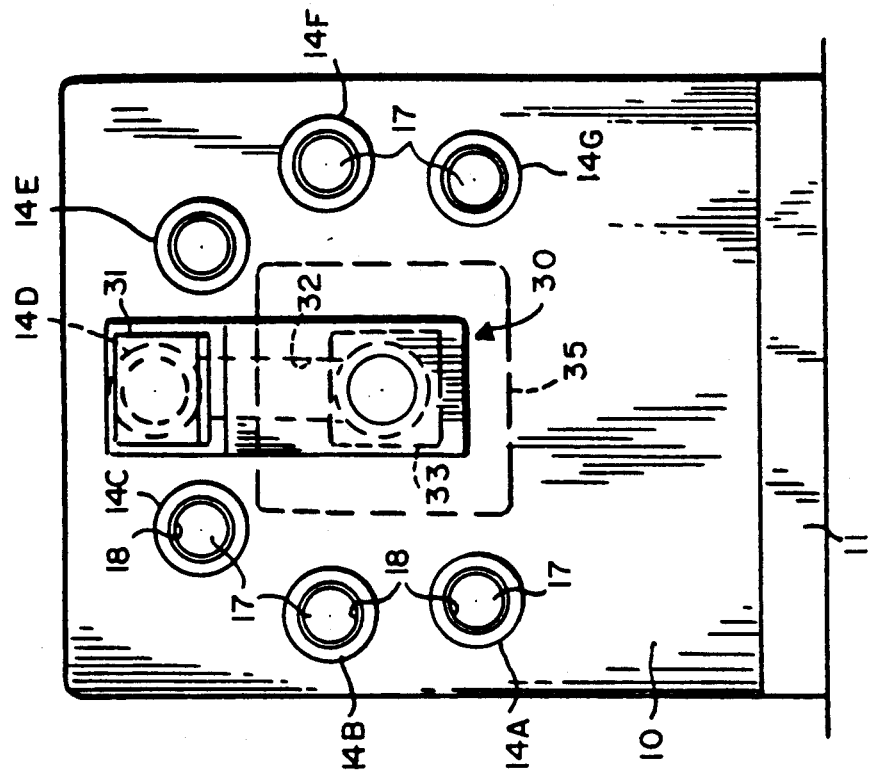

A plurality of such optical modules are positioned in a similar manner in mounting plate 10 for permitting a plurality of optical fibers to be connected thereto, an exemplary arrangement thereof being shown in FIG. 2 wherein seven optical modules 14A–14G are positioned in a circular manner in mounting plate 10. Accordingly, each of the collimated light beams produced in response to optical signals from each of the plurality of optical fibers corresponding to modules 14A–14G is arranged to be directed along the axis of the optical channel of the corresponding module. The optical module in FIG. 1, for example, corresponds to the module depicted as 14D in FIG. 2.

In accordance with the invention, it is desired to arrange for the optical signals associated with each of the optical channels of modules 14A–14G to be selectively placed in optical communication with an optical channel formed by an optical module 23 which is mounted on a second mounting plate 20, as shown in FIG. 1. Mounting plate 20 is fixedly attached to a base plate 21 and projects upwardly and perpendicularly therefrom. In the embodiment shown, the optical module 23 is depicted as including an optical detector 22, fixedly mounted within an optical channel 24 along the axis 24A thereof. A lens 25 is mounted within module 23 so as to focus a collimated beam, which enters the recessed opening 26, onto the active region of optical detector 22. The module 23 is fixedly positioned on mounting plate 20 so that the optical axis 24A of channel 24 is parallel to the optical axis 16A of each of the optical channels of modules 14A–14G. Once lens 25 is suitably positioned for such purpose, it can be fixedly retained within module 23 by using an appropriate cement or adhesive material 27, as shown. While lens 25 is used to provide such focusing operation, any other suitable means for providing the desired focusing of the collimated beam can be chosen and used by those in the art for such purpose.

A rotor 30 is mounted in the space between modules 14A–14G and module 23, as shown in FIG. 1, and includes a first reflective surface, or mirror, 31 mounted at one end of an rotor optical channel 32 and a second reflective surface, or mirror, 33 mounted at the other end of optical channel 32, as shown. The reflective surfaces are fixedly positioned relative to each other so as to be parallel. The rotor 30 is mounted on a rotating shaft 34 of a stepping motor 35, which shaft rotates in steps through a complete revolution so that the rotor can be positioned at a number of different stepped locations about shaft 34.

When the rotor is positioned so that mirror 31 is appropriately disposed with respect to one of the optical modules on mounting plate 10, e.g., opposite module 14D, as shown in FIGS. 1 and 2, a collimated beam from lens 17 enters an input port 36 of rotor 30 and is reflected from reflective surface 31 through optical channel 32 on to reflective surface 33 from where it is reflected through an output port 37 to module 23. Output port 37 remains concentric with the motor shaft 34 as the rotor rotates, while input port 36 can be placed into a concentric relationship with each of the modules 14A–14G in turn as the rotor rotates.

Since the reflecting surfaces 31 and 33 are parallel, any ray entering input port 36 which does not strike an interior surface of the walls of the channels within the rotor will exit from output port 37 in a direction parallel with the direction of the ray entering at input port 36. In other words, no matter what the position or tilt of the rotor 30, there is no change between the entrance and exit angles of rays passing through the rotor. For an ideal lens 25 at assembly 23, the point where a ray intercepts the focal plane thereof is dependent only on the incident angle, not on the location on the lens where the ray strikes the lens surface. Consequently, the location in the detector of the image of the optical signal from an optical fiber 12 will impinge substantially on the same area of the detector, independently of the rotor's rotational position or tilt, up to the point where vignetting by the walls of the rotor channels or by the edges of the detector occurs.

It should be noted that the function of the moving rotor assembly is relatively insensitive to small changes in the lateral and angular positioning thereof. Thus, so long as the pre-aligned, fixedly positioned parts of the device remain in their fixed positions, the tolerances on positioning of the rotor assembly with respect to the non-moving parts are relaxed, permitting use of bearings and motors of lower precision and lower cost and rendering the function of the device insensitive to wear of the moving parts.

Since the areas of the lenses 17 and 25 and the areas of the reflecting surfaces 31 and 33 are substantially greater than the end area of a fiber core 15, typically hundreds of times greater, any particles on the surfaces of such exposed parts of the device will have little or no adverse effect on the coupling efficiency of the system and would have far less effect than if such particles were on the surface of the core area of the fiber itself.

Stepping motor 35 can be suitably controlled using well known motor control techniques so as to cause the rotor to rotate to selected positions opposite the various optical channels at stations 14A-14G so that the reflecting surface 31 can be placed in optical communication with anyone of the optical channels located at each of such stations. For example, if a stepping motor is selected to provide 200 stepped positions in one revolution, at a stepping rate of 100 steps per second, and if there are 10 equally spaced optical module stations, the signal channel selection device of the invention can select the optical channel at any station within one second and can move between adjacent stations within 0.2 second.

While the optical signal channel selection device described above represents a preferred embodiment of the invention, modifications thereto within the spirit and scope of the invention may occur to those in the art. Thus, although the embodiment depicted shows coupling from optical fibers to an optical detector, the device can be utilized to couple optical fibers to another optical fiber. Further, while critical applications requiring relatively broad bandwidths may make it desirable to use achromatic lenses, in many other less critical applications simple meniscus lenses of low dispersion material should be adequate. Hence, the invention is not to be construed as limited to the specific embodiment described except as defined by the appended claims.

What is claimed is:

1. An optical signal channel selection device comprising
   a plurality of first fixedly positioned optical signal channels for transmitting collimated optical beam signals along a plurality of first parallel channel axes;
   a second fixedly positioned optical signal channel for transmitting collimated optical beam signals along a second channel axis which is parallel to said first channel axis;
   a rotor structure having an open walled optical channel formed therein and a pair of ports communicating with said open walled optical channel;
   a pair of mirrors fixedly mounted on said rotor structure at the ends of said open walled optical channel and arranged so as to be parallel with each other and in optical communication with respective ones of said pair of ports, an input collimated optical beam signal incident upon one of said pair of mirrors being directed through said channel toward and reflected from the other of said pair of mirrors through its associated port in parallel with said input signal, said mirrors being larger than the collimated beam signals from said first optical signal channels or said second optical signal channel; and
   means for rotating said rotor structure to move said pair of mirrors so that said one of said mirrors and its associated port can be selectively positioned opposite selected ones of said plurality of first optical signal channels and the other of said mirrors and its associated port is positioned opposite said second optical signal channel.

2. A device in accordance with claim 1 wherein each of said plurality of first collimated optical signal channels includes an optical fiber, the end of which is inserted in said channel, for supplying optical beam signals therefrom for transmittal along the axis of said channel;
   said second optical channel includes an optical detector device positioned in said channel along the axis thereof for detecting optical beam signals transmitted thereto through said second optical channel.

3. A device in accordance with claim 1 wherein each of said plurality of first optical signal channels includes an optical fiber, the end of which is inserted in said channel, for supplying collimated optical beams signals, therefrom for transmittal along the axis of said channel;
   said second optical channel includes an optical fiber, the end of which is inserted in said channel and is positioned along the axis thereof for receiving collimated optical beams signals transmitted thereto through said second optical channel.

4. A device in accordance with claim 1 wherein said plurality of first optical signal channels are arranged in a circular fashion.

5. A device in accordance with claim 4 and further including a stepping motor having a rotatable shaft, said rotor structure being mounted on said shaft.

6. A device in accordance with claim 2 wherein the area of each of said mirrors is substantially greater than each of the areas of the ends of said optical fibers or the area of said optical detector device.

7. A device in accordance with claim 2 wherein each of said first optical signal channels includes a first optical means responsive to the optical signal from said optical fibers inserted therein for producing said collimated optical beam signals for impingement on the first of said mirrors; and
   said second optical signal channel includes a second optical means responsive to said collimated optical beam signals reflected from said second mirrors for focussing said collimated optical beam signals on said detector.

8. A device in accordance with claim 7 wherein said first and second optical means are each fixedly positioned in recesses in said first and second optical signal channels, respectively.

9. A device in accordance with claims 7 or 8 wherein each of said first and second optical means is an optical lens.

10. A device in accordance with claim 3 wherein the area of each of said mirrors is substantially greater than each of the areas of the ends of said optical fibers or the area of said optical detector device.

11. A device in accordance with claim 3 wherein each of said first optical signal channels includes a first optical means responsive to the optical signal from said optical fibers inserted therein for producing said collimated optical beam signals for impingement on one of said pair of mirrors; and
   said second optical signal channel includes a second optical means responsive to said collimated optical beam signals reflected from the other of said pair of mirrors for focussing said collimated optical beam signals on the end of said second optical fiber.

12. A device in accordance with claim 7 wherein said first and second optical means are each fixedly positioned in recesses in said first and second optical signal channels, respectively.

13. A device in accordance with claims 11 or 12 wherein each of said first and second optical means is an optical lens.

* * * * *